United States Patent
Davies

[15] 3,673,925
[45] July 4, 1972

[54] FLUID MOTOR

[72] Inventor: Robert H. Davies, Aurora, Ohio 44202
[73] Assignee: Parker-Hannifin Corporation, Cleveland, Ohio
[22] Filed: Jan. 6, 1969
[21] Appl. No.: 789,304

[52] U.S. Cl. ..................................92/128, 92/220, 287/20 P
[51] Int. Cl. .................................................F01b 29/00
[58] Field of Search.................92/128, 288, 59, 164, 163, 92/165, 257, 256, 255, 220, 221, 168, 138, 64, 48, 51; 91/26, 24; 287/20 P, 20, 53 R

[56] References Cited

UNITED STATES PATENTS

| | | | |
|---|---|---|---|
| 3,440,930 | 4/1969 | Olson | 91/26 X |
| 2,795,443 | 6/1957 | Gratzmuller | 287/53 R |
| 3,331,291 | 7/1967 | Rumsey | 92/64 X |
| 3,417,671 | 12/1968 | Stevenson et al. | 92/64 X |
| 3,509,795 | 5/1970 | Woodward | 92/48 X |
| 1,684,862 | 9/1928 | Gay | 287/20 X |
| 2,427,061 | 9/1947 | Mawhirter | 287/20 X |
| 2,468,511 | 4/1949 | Pilch | 92/165 |
| 2,853,347 | 9/1958 | Cooper, Jr. | 92/128 |
| 2,890,917 | 6/1959 | Prince | 92/164 X |
| 2,987,046 | 6/1961 | Atherton | 92/128 |
| 3,333,899 | 8/1967 | Christian | 92/128 X |
| 3,402,645 | 9/1968 | Nelson | 92/258 |
| 3,450,003 | 6/1969 | Nightingale | 92/164 |

FOREIGN PATENTS OR APPLICATIONS

| | | | |
|---|---|---|---|
| 560,738 | 7/1958 | Canada | 287/20 |
| 887,088 | 1/1962 | Great Britain | 287/20 |

Primary Examiner—Martin P. Schwadron
Assistant Examiner—Leslie J. Payne
Attorney—John N. Wolfram

[57] ABSTRACT

A cylinder type fluid motor in which the piston and piston rod are each symmetrical whereby either end of the rod may be attached to either side of the piston and to the external working member. The rod is of uniform diameter throughout with only internal threads for attachment by means of high strength bolts or studs to the piston and working member whereby the rod may be of low cost material and yet provide high strength.

2 Claims, 4 Drawing Figures

PATENTED JUL 4 1972　　3,673,925

INVENTOR:
ROBERT H. DAVIES
ATTORNEY
John N. Wolfram

3,673,925

FLUID MOTOR

BACKGROUND OF THE INVENTION

In pneumatic and hydraulic cylinders for high pressure applications it is customary to make the piston rods of low carbon steel that has been accurately ground to size and case hardened to prevent nicking and other damage in case exposed portions of the rod are struck by various external articles. The rod material is customarily ground and case hardened while in long bar form and is then cut to the desired rod length.

Previous piston and designs have utilized externally threaded ends for attachment to the piston. This requires annealing of the rod end in order to turn and thread the same and utilizes rod material for the externally threaded portion that is relatively expensive because of the prior grinding and case hardening operations.

SUMMARY OF THE INVENTION

The piston rod of the present invention is cheaper than previous rods because it utilizes less of the relatively expensive case hardened and ground rod stock and it provides a stronger construction than previous piston rods. This is accomplished by internally threading the rod at both ends and using standard bolts or studs to attach it to the piston and work member whereby a shorter length of rod material is used than when external threads are formed directly on the rod. Also, the use of internal threads does not require annealing of the rod ends and permits the rod to be of uniform outside diameter throughout its length for maximum strength. Moreover, the rod and piston are each symmetrically formed so that either can be reversed in its attachment to the other for simplifying assembly procedure. Also, the rod may be provided with identical cushioning means on each side to accommodate such reversal and the rod is sealed by a simple form of packing arrangement that permits ready replacement of the packing ring. The design also permits attachment of two rods to the piston for furnishing double rod type cylinders.

DESCRIPTION

Cylinder 10 includes a tubular body 11 closed at one end by an end cap 12 and at the other end by an end cap 13, the caps being held in position by bolts 14 that extend the length of the cylinder.

Figure 1:
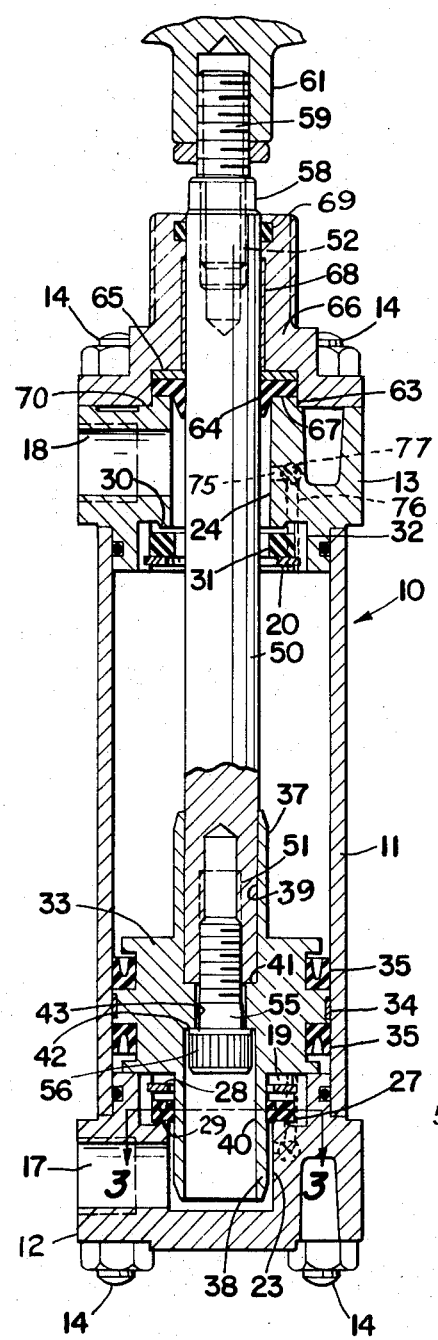
FIG. 1 is a longitudinal cross section view through a cylinder designed for pneumatic operation.
Figure 2:
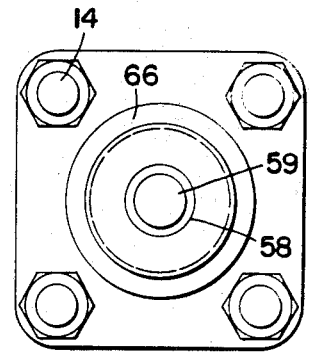
FIG. 2 is a view of the rod end of the cylinder.
Figure 3:
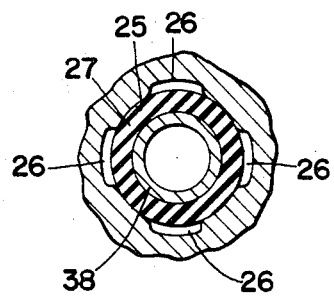
FIG. 3 is a fragmentary cross section along the lines 2—2 of FIG. 1.

Caps 12, 13 respectively have fluid passages 17, 18 connecting the interior of cylinder body 11 to the exterior, and such passages including cushioning recesses 19, 20 and axial bores 23, 24. As shown in FIGS. 1 and 3, cushioning recess 19 includes a circular counterbore 25 that is cut out or enlarged as at 26 at several circumferentially spaced points and contains a resilient packing ring 27 that is retained by a snap ring 28 and is engageable with annular seat 29. Cushioning recess 20 is similarly constructed with a seat 30, cutouts 32 and a cushioning ring 31.

Cylinder body 11 contains a piston 33 that on its outer periphery has a plastic bearing ring 34 and resilient packings 35. On opposite sides of the piston are cylindrical extensions 37, 38 having counterbores 39, 40 that terminate at their inner ends in transverse shoulders 41, 42 that intersect a central bore 43. Extensions 37, 38 and counterbores 39, 40 are respectively of identical length and piston 33 is otherwise symmetrically formed on opposite sides of a transverse central plane.

Piston rod 50 is of uniform outside diameter and has internal threads 51, 52 at the ends thereof that preferably are of the same size. As shown, the inner end of rod 50 is received within counterbore 39 with a close guiding fit and abuts transverse shoulder 41 and is attached to piston 33 by a bolt 55 having a head 56 engaged with shoulder 42. At its other end rod 50 projects from the cylinder and has an externally threaded stud 58 threaded into internal thread 52, there being an outer threaded section 59, which can be of larger diameter than thread 52, that is for attachment to an internally threaded work member 61.

Rod 50 is preferably made of low carbon steel bar material that has been case hardened, ground to size and then cut to length with an abrasive disk. The end surfaces of the cut lengths provided in this manner are not hard and therefore no annealing is required in order to drill and tap internal threads 51, 52.

Bolt 55 and stud 58 are of hardened steel but because they are standard commercially available items their cost is less than the cost of the additional length of piston rod material that is required for machining external threads directly on the rod in accordance with previous practice.

Internal threading of rod 50 also permits the rod to be of substantially uniform diameter throughout its length, thus avoiding weakening effects of grooves or steps in its outside diameter to provide a configuration for maximum strength.

Because rod 50 and piston 33 are symmetrically formed in their internal and external machinings, either or both may be assembled in reversed position without affecting installation or assembly of the cylinder. Thus, before the piston is placed within the cylinder body, the rod can have either of its ends inserted within either of piston counterbores 39 and 40 and fastened thereto by stud 55. Stud 58 then may be assembled to the other end of rod 50.

The upper surface 70 of cap 13 is machined flat except for cored weight reducing recesses and a short annular axial extension 63 against whose outer face is clamped a resilient packing 64 by means of a washer 65 and a bearing housing 66. The latter is attached to end cap 13 by bolts 14 and has a flat planar face 69 for easy machining. Extension 63 centers housing 66. In housing 66 is a plastic bearing sleeve 68 and a rod scraper ring 69.

The use of an exterior boss 63 to provide an end sealing surface 67 engageable by packing 64 facilitates inspection of the sealing surface and of assembly and replacement of the packing. Thus to assemble the packing it is only necessary to slip it over the rod against surface 67 and bolt housing 66 into place. When replacing packing 64, housing 66 is unbolted and packing 64 will remain in the housing from which it may be readily removed.

End cap 13 also has bleed passages 75, 76 controlled by needle valve 77 threaded into end cap 13 to connect the interior of cylinder body 11 with bore 24. A similar bleed passage and needle valve arrangement is provided in cap 12.

To extend the piston rod air under pressure admitted from the exterior to passage 17 passes into bore 23 and moves packing 27, which is in sealed engagement with extensions 38, upwardly against snap ring 28 and away from seat 29 to permit fluid to flow into cutouts 26 to act on the underside of piston 33 and move the latter upwardly. Meanwhile, air on the upper side of piston 33 passes between rod 50 and packing 31 and into bore 24 to be discharged through passage 18. At the same time a small amount of air passes from the cylinder through bleed passages 75, 76 past needle valve 77 to bore 24 and passage 18.

As piston 33 approaches the upper end of its stroke, extension 37 enters packing 31 in sealing engagement therewith and the packing is moved upwardly into sealing engagement with seat 30 to cut off flow of air past packing 31 so that air now escapes only at a slow rate through bleed passages 75, 76 to thus cushion stopping of the piston in its upward stroke.

To retract the piston air under pressure is admitted to the cylinder via passage 18 and recess 20 and air from the cylinder is exhausted through recess 19 and passage 17 with the functions of packings 31, 27 reversed and with cushioning occurring at the lower end of the piston stroke.

Figure 4:
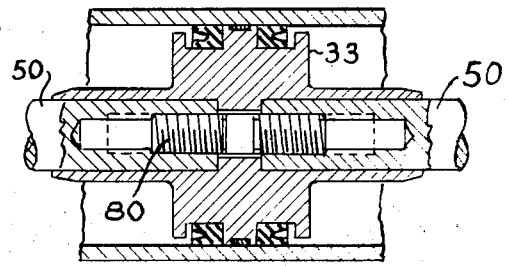
FIG. 4 is a fragmentary cross section view of a double rod type cylinder.

To make up the double rod type cylinder shown in FIG. 4 two rods 50, identical to the rod 50 of FIG. 1, are attached to opposite sides of piston 33 and held in place by a threaded stud 80. The cap 12 of FIG. 1 is omitted so that a cap 13, housing 66 and packing 64, corresponding to those in FIG. 1, are attached to each end of body 11 and through which the rods 50 project. Thus a piston and two piston rods identical with those of FIG. 1 are used for making a double rod cylinder.

I claim:

1. A fluid motor comprising a hollow cylindrical body having a bore at one end thereof, a rigid piston reciprocable in the body, said piston being symmetrical about a central transverse axis and having axial bores of equal diameter and length in its opposite ends, all said bores being of substantially the same diameter, a rod extending through an end of the body and having an end portion fitting within said body bore and at its other end having a portion fitting within one of said piston bores, first internal attachment means formed on one end of the rod cooperating with means on the piston to attach the piston to the rod, second internal attachment means formed on the other end of the rod for attaching the rod to a work member, said first and second attachment means being identical and the external diameter of the rod at one end being substantially the same as the diameter at the other end whereby either end of the rod will fit into any of said bores whereby either or both the rod or piston may be reversed in the motor without changing the configuration of the motor.

2. The fluid motor of claim 1 in which said bolt and stud are of high strength material and said rod is of relatively low strength material.

* * * * *